(12) United States Patent
Saunders et al.

(10) Patent No.: US 11,549,242 B2
(45) Date of Patent: Jan. 10, 2023

(54) ARTICLE HANDLER

(71) Applicant: CQMS PTY LTD., Murarrie (AU)

(72) Inventors: Bradley Darren Saunders, Kewdale (AU); Bradley James Higgins, Kewdale (AU)

(73) Assignee: CQMS PTY LTD.

(*) Notice: Subject to any disclaimer, the term of this patent is extended or adjusted under 35 U.S.C. 154(b) by 1021 days.

(21) Appl. No.: 16/144,515

(22) Filed: Sep. 27, 2018

(65) Prior Publication Data
US 2020/0102722 A1 Apr. 2, 2020

(51) Int. Cl.
*E02F 9/28* (2006.01)
*B25J 5/00* (2006.01)
*E02F 3/60* (2006.01)
*E02F 3/40* (2006.01)

(52) U.S. Cl.
CPC ............ *E02F 9/2825* (2013.01); *B25J 5/007* (2013.01); *E02F 3/40* (2013.01); *E02F 3/60* (2013.01); *E02F 9/2883* (2013.01)

(58) Field of Classification Search
CPC ....... B66F 9/065; E02F 3/3604; E02F 3/4133; E02F 3/4135; E02F 3/4136
USPC ...................................................... 414/729
See application file for complete search history.

(56) References Cited

U.S. PATENT DOCUMENTS

| | | | | |
|---|---|---|---|---|
| 4,516,905 A * | 5/1985 | Cavin | ............ | B66F 9/184 414/911 |
| 6,098,320 A * | 8/2000 | Wass | ............ | E02F 3/404 37/406 |
| 6,655,899 B1 * | 12/2003 | Emerson | ............ | E02F 3/34 294/86.41 |
| 7,223,062 B1 * | 5/2007 | Emerson | ............ | E02F 3/96 37/468 |
| 7,537,428 B2 * | 5/2009 | Hutchinson | ............ | B66C 1/585 144/336 |
| 9,132,696 B2 * | 9/2015 | Grengs | ............ | B60B 30/02 |
| 2010/0164243 A1 | 7/2010 | Albin | | |
| 2015/0151576 A1 | 6/2015 | Grengs | | |
| 2015/0197916 A1 | 7/2015 | Honermann | | |

FOREIGN PATENT DOCUMENTS

WO 2015061232 A1 4/2015

OTHER PUBLICATIONS

Australian Search Report for Application No. 2018203791, dated Aug. 16, 2019, 1 page.
Australian Search Report for Application No. 2018203791, dated Jul. 23, 2020, 1 page.
Australian Search Report for Application No. 2018203791, dated Jun. 11, 2020, 1 page.

* cited by examiner

*Primary Examiner* — Saul Rodriguez
*Assistant Examiner* — Brendan P Tighe
(74) *Attorney, Agent, or Firm* — Lerner, David, Littenberg, Krumholz & Mentlik, LLP

(57) ABSTRACT

An article handler for attachment to a front end loader, the article handler comprising a support body and a jaw assembly, the support body comprising a proximal end adapted for attachment to the front end loader, and a distal end adapted for attachment of the jaw assembly. The article handler may be adapted to handle, install, and dismount ground engaging tools (GET), such as teeth for excavating buckets.

15 Claims, 5 Drawing Sheets

ARTICLE HANDLER

TECHNICAL FIELD

The present invention relates to devices for handling articles.

The invention has been devised particularly, although not necessarily solely, in relation to handling of ground engaging tools (GET) such as teeth for excavating buckets.

BACKGROUND ART

The following discussion of the background art is intended to facilitate an understanding of the present invention only. The discussion is not an acknowledgement or admission that any of the material referred to is or was part of the common general knowledge as at the priority date of the application.

The teeth of excavating buckets on occasions suffer damage during use and, thus, need to be repaired or replaced.

To replace or repair the teeth of excavating buckets, the teeth typically need to be dismounted from the excavating bucket to which they are attached. For this, the teeth are extracted from the particular supports (referred to as adaptors) extending from the edge of the excavating bucket.

The dismounting and mounting of the teeth from the adaptors of the excavating bucket can be a cumbersome and dangerous process. This is particularly due to the relatively large size and weight of each one of the teeth. Hand and foot injuries are examples of injuries that operators can be subject to during mounting and dismounting of the teeth.

Also, typically, removal of a tooth is a difficult and cumbersome process. The process may require applying periodical forces (such as twisting and pulling forces) of a relative large magnitude to the tooth to loosen up the joint between the tooth and the adaptor to which the teeth is attached with the objective of removing of the teeth from the adaptors. Typically, the joint between the tooth and the adaptor becomes difficult to break up due to debris and corrosion building up in the tooth-adaptor joint in particular if the teeth has been attached to the adaptor for a relative long time.

Furthermore, transportation of the teeth, from, for example, a storage location to the particular excavation bucket onto which the teeth will be mounted, is also typically a cumbersome and dangerous process subjecting the operators also to injuries such as hand and feet injuries.

It is against this background that the present invention has been developed.

SUMMARY OF INVENTION

According to a first aspect of the invention there is provided an article handler for attachment to a front end loader, the article handler comprising a support body and a jaw assembly, the support body comprising a proximal end adapted for attachment to the front end loader, and a distal end adapted for attachment of the jaw assembly.

Preferably, the jaw assembly is attached to the support body in such a manner that the jaw assembly may be selectively displaced between a closed condition and an open condition.

Preferably, the jaw assembly comprises an upper jaw and a lower jaw; both jaws being pivotally attached to the distal end of the support body.

Preferably, each of the upper jaw and a lower jaw comprise a gripping member.

Preferably, each of the upper and lower jaws and comprises an arm member having a proximal end for pivotally attaching the jaws to the support body and a distal end for attaching the gripping member to each of the jaws.

Preferably, the gripping members are pivotally attached to the distal ends of the arm members so as to permit pivotal movement of the gripping member.

Preferably, the gripping members comprise an inner ribbed surface.

Preferably, the gripping members are spaced apart from the support body defining a clearance between the distal end of the support body and the gripping members.

Preferably, the proximal ends of the arm members are attached to the distal end of the support body and extend forward from the support body such that the gripping members are spaced apart from the support body for receiving a portion of the article to be handled by the article handler.

Preferably, the clearance is bounded by the distal end of the support body, the arm members and the gripping members.

Preferably, the clearance is adapted to receive a front portion of the article to be handled by the article handler.

Preferably, the arm members are adapted to increase pivotal movement of the gripping members.

Preferably, the arm members comprise curved beams that are curved outwardly from a longitudinal axis of the article handler to at least partly define the clearance. Such curved beams:

(1) define a clearance of increased volume; and (2) enable increased pivotal movement of the gripping members.

Preferably, the article handler further comprises means for selectively displacing the jaw assembly between an open condition and a closed condition.

Preferably, the means for displacing the jaw assembly comprises at least one hydraulic cylinder operatively attachable (or attached) to a hydraulic system of the front end loader.

Preferably, the article handler further comprises a mounting plate for attachment of the support body of the article handler.

Preferably, the mounting plate comprises reinforcement means.

Preferably, the mounting plate comprises a first face for attachment of the support body and a second face for attachment to a hitch of the front loader.

Preferably, the second face is adapted for quick attachment and quick release of the mounting plate from the hitch.

Preferably, the second face comprises an upper flange and a lower flange, the upper flange being configured for receiving an upper end of the hitch, and the lower flange being configured for receiving a lower end of the hitch.

Preferably, the article handler is adapted to be rotated around the longitudinal axis of the article handler so as to rotate the jaw assembly.

Preferably, the article handler comprises a disc rotatable attached to the proximal end of the support body.

Preferably, the disc comprises a shaft extending from the disc into the support body.

Preferably, the article hander comprises means for rotating the support body.

Preferably, the support body comprises handles to allow manual rotation of the handler.

Preferably, the article handler comprises means for rotating the article handler from a remote location.

Preferably, hydraulic or electric actuation means are operatively attached to the article handler and to the hydraulic or electric systems of the front loader for rotating of the article handler upon activation of the hydraulic or electric actuation means by the operator of the article handler.

Preferably, the article handler comprises means for selectively displacing the support body between a contracted condition and an extended condition, the extended condition being when the proximal end of the support body is proximal to the hitch and the extended condition being when the proximal end of the support body is distal to the hitch.

Preferably, the article handler comprises a retraction system within the support body for selectively displacing the support body between a contracted condition and an extended condition.

In a particular arrangement, the retraction system comprises a hydraulic cylinder having a piston and a hydraulic chamber.

Preferably, the piston is operatively attached to a shaft that extends into the support body, the shaft having a first end attached to the piston and a second end adapted for attachment to the hitch or a mounting plate.

Preferably, the hydraulic chamber is fluidly connected to the hydraulic system of the front end loader.

Preferably, the article handler is adapted to handle, install and dismount ground engaging tools (GET), such as teeth for excavating buckets.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENT(S)

Figure 1:
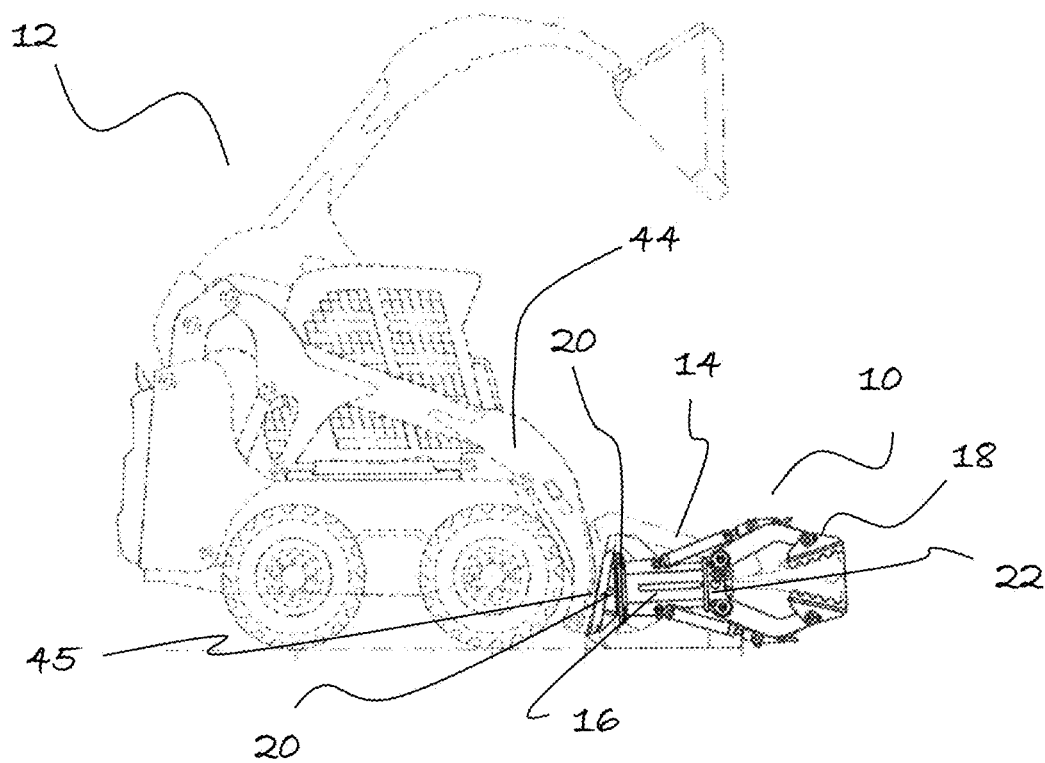
FIG. 1 is a side view of a particular arrangement of an article handler in accordance with an embodiment of the invention attached to a front end loader such as a skid steer loader.
Figure 2:
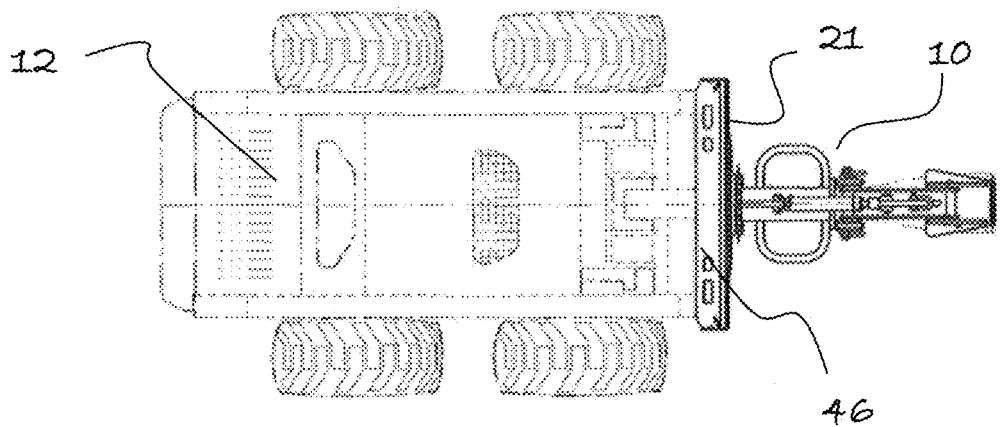
FIG. 2 is a top view of the article handler shown in FIG. 1 attached to the skid steer loader.
Figure 3:
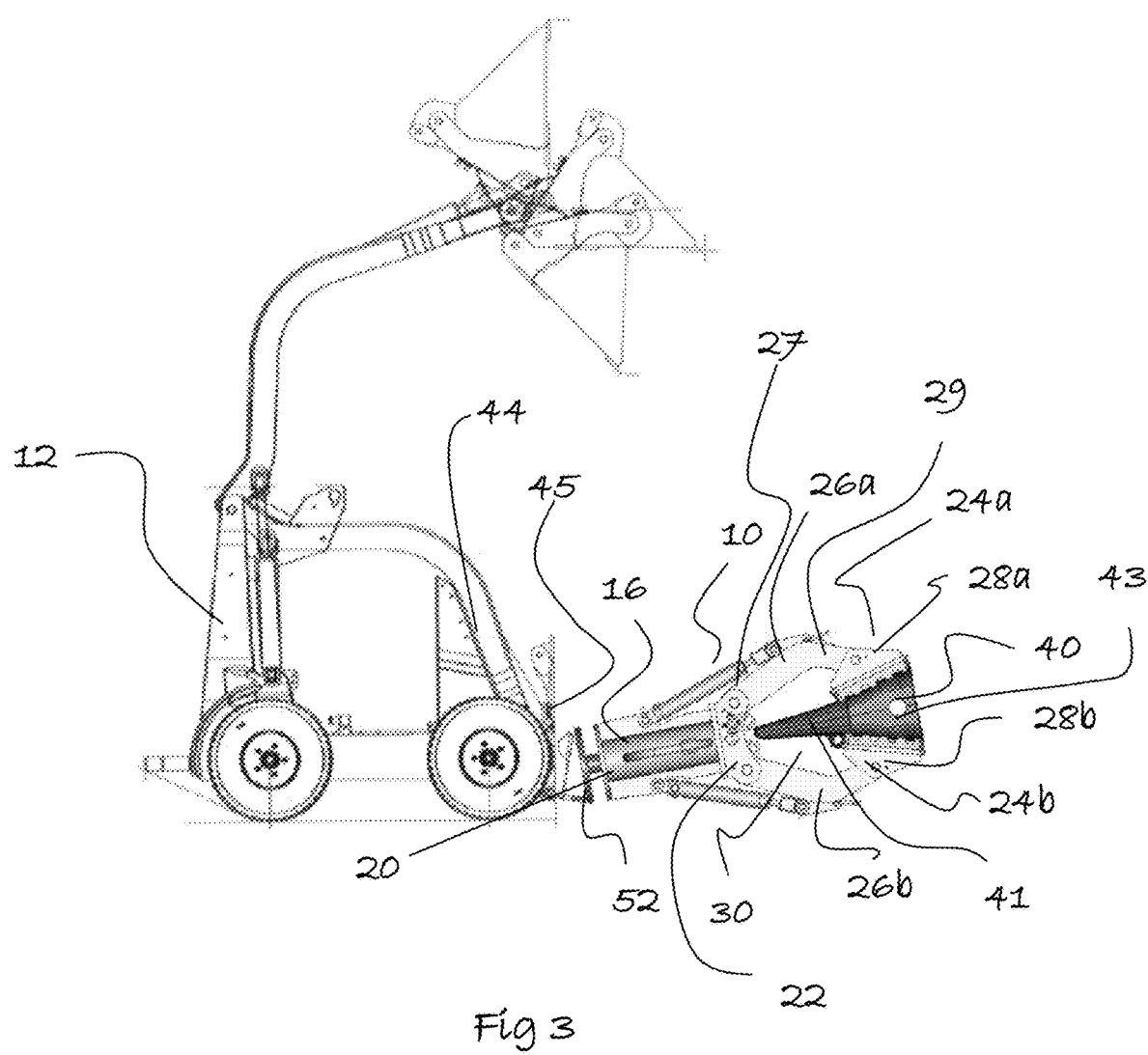
FIG. 3 is a side view of the article handler shown in FIG. 1 attached to a front end loader such as a mini skid steer loader.

FIGS. 1 to 3 show a particular arrangement of an article handler 10 in accordance with an embodiment of the invention attached to a front end loader 12 such as a skid steer loader as shown in FIGS. 1 and 2 or a mini skid steer loader as shown in FIG. 3.

One of the possible applications of the article handler 10 of the present embodiment of the invention shown in the figures relates to processes for handling (for example, transportation), installation and dismounting of ground engaging tools (GET) such as teeth 14 for excavating buckets.

As will be described below, the particular arrangement of article handler 10 shown in the figures is adapted to allow transportation and attachment of the teeth 14 in a safe manner reducing the risks of injury to the operators in charge of installation, maintenance and repair of the teeth 14. Also, the particular arrangement of article handler 10 shown in the figures is adapted to facilitate removal of the teeth 14 from the bucket to which the teeth 14 is attached. For example, the article handler 10 is adapted to rotate around its longitudinal axis to twist the teeth; this is particularly useful for attaching and removing twist-lock type teeth as well as for loosening any debris or corrosion built up in the tooth-adaptor joints to facilitate removal of the teeth 14 from the adaptor. Also, the article handler 10 is adapted to move axially parallel to the longitudinal axis of the teeth; this is also particular useful for any debris or corrosion built up in the tooth-adaptor joints.

The particular arrangement of article handler 10 shown in the figures comprises a support body 16 and a jaw assembly 18. The support body 16 comprises proximal end 20 adapted to be attached to a support plate 21 (see FIG. 5) for attachment to the front end loader 12, and a distal end 22 adapted to receive the jaw assembly 18.

The jaw assembly 18 is attached to the support body 16 in such a manner that the jaw assembly 18 may be selectively displaced between a closed condition and an open condition.

As shown in, for example, FIG. 3, the jaw assembly 18 comprises an upper jaw 24a and a lower jaw 24b; both jaws 24 are pivotally attached to the distal end 22 of the support body 16. Each of the upper and lower jaws 24a and 24b comprises an arm member 26 having a proximal end 27 for pivotally attaching the jaws 24 to the support body 16 and a distal end 29 for attaching a gripping member 28 to each of the jaws 24.

The gripping members 28 are pivotally attached to the distal ends so as to permit pivotal movement of the gripping member 28. The pivotal movement allows movement of the gripping members 28 so as to vary the inclination of the gripping members 28. In this manner, the orientation of gripping members 28 may be adjusted to the particular shape and contour of the particular article (such as the teeth 14) that will be handled by the article handler 10. This permits securely grabbing a tooth 14 to transport it safely to the excavating bucket for attachment of the tooth to the excavation bucket.

Figure 8:
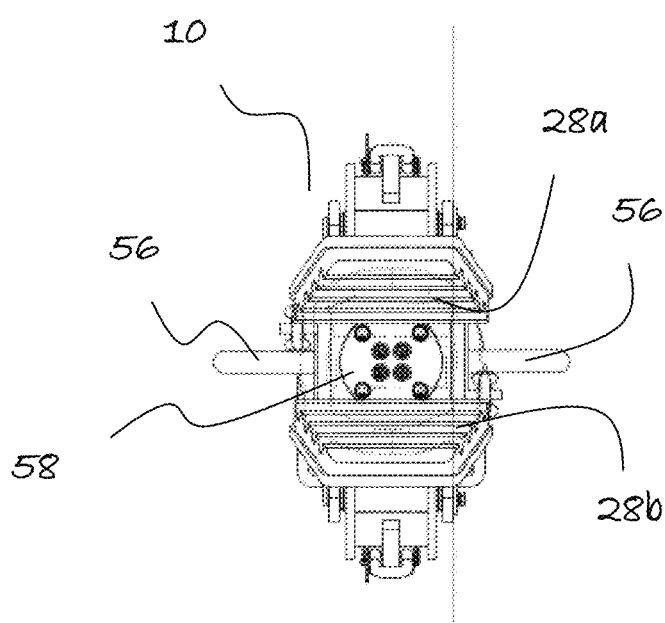
FIG. 8 is a front view of the article handler shown in FIG. 6.

Further, as can be seen best in FIG. 8, the gripping members 28 comprises an inner surface (the surface that enters in contact with the teeth 14) comprising a ribbed surface to increase the holding capacity of the gripping members 28 when a tooth 40 (or any other article) is sandwiched between the gripping members 28.

Furthermore, as shown in FIG. 3, the proximal ends 27 of the arm members 26 are attached to the distal end 22 of the support body 16 and extend forward from the support body 16. In this manner, the gripping members 28 are spaced apart from the support body 16 defining a clearance 30. The clearance 30 is bounded by the support body 16, both arm members 26 extending side by side from the support body 16, and the gripping members 28 attached to ends to the arm members 26.

It is particularly advantageous that the arm members 26 are relatively long so as to space apart the gripping members 28 from the support body 16; this can be appreciated by simple inspection of, for example, FIG. 3—as shown the pointed end 41 of the tooth 40 may be received within the article handler 10 while the gripping members 28 are holding the support body 43 of the tooth 40.

Further, in the particular arrangement shown in the figures, the arm members 26 are configured as curved beams so as to define a clearance 30 of increased volume; thus, articles (other than teeth 40) and that have ends of relative large size may also be handled by the article handler 10. And, the curved configuration of the arm members 26 permit increasing the range of pivotal movement of the gripping members 28; this allows for the gripping members 28 to pivot around the distal ends of the arm members 26 so as to adjust the orientation of the gripping members to the shape of a great variety of articles having support bodies 43 of different type of shapes.

Moreover, as mentioned before, the arm members 26 are pivotally attached to the distal end 22 of the support body 16 of the article handler 10 to selectively close and open the article handler 10 to, respectively, grab or release a tooth 14. For this, the proximal end 27 of each arm member 26 is adapted to define a pivot joint 32 together with a bracket member 34 that is attached to the distal end 22 of the support body 16—this can be seen, for example, in FIG. 4.

Figure 4:
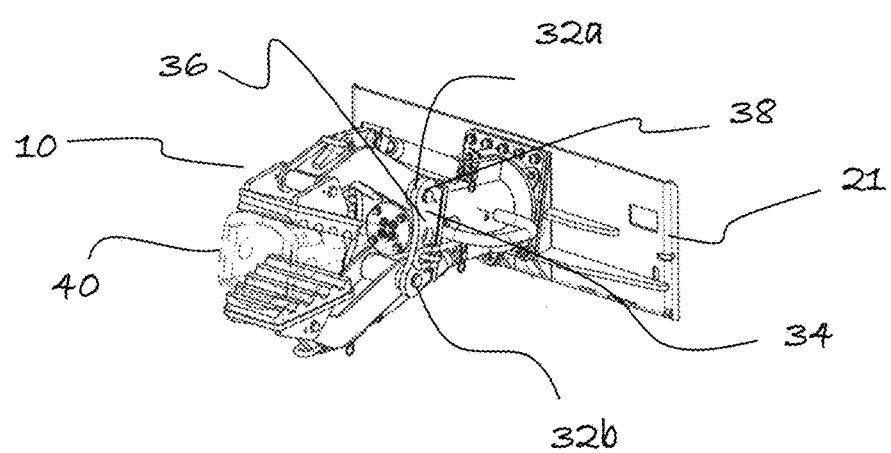
FIG. 4 is a front perspective view of the article handler shown in FIG. 1 detached from the skid steer loader.

As shown in FIG. 4, the bracket member 34 comprises two spaced apart plates 36 attached at each side of the distal end of the support body 16 defining spacing between the plates 36 for receiving the proximal ends 27 of the support arms 26.

Further, the proximal end 27 of each support arm 26 comprises a passage traversing each proximal end 27. And, each plate 36 comprises an upper opening and a lower opening defining upper and lower pairs of spaced apart openings. The pivot joints 32 are defined by locating the proximal end 27 of the support arms 26 between the plates 36 and traversing pins 38 through the upper and lower pairs of spaced apart openings as well as the passages of the proximal ends 27 of the arm members 26.

The pivotal attachment permits selectively pivoting arm members 26 between a closed condition where the jaws 24 are joined together, and an open condition when the jaws 24 are spaced apart with respect to each other. In the arrangement of article handler 10 shown in the figures, a tooth 40 is located between the jaws 28. In this condition, the tooth 40 may be, for example, transported to the excavating bucket for installation of the tooth 40 onto the adaptor attached to the bucket. After installation of the tooth 40, the jaws 28 may be separated by pivoting the arm members 28 towards the open condition releasing the tooth 40. The article handler 10 may then pick up another tooth 40; this is accomplished by positioning the article handler 10 with its jaws 24 in the open condition in front of another tooth 40 and moving the arm members 28 towards the closed condition to grab the tooth 40 and to transport the tooth 40 to the location where the bucket (onto which the tooth will be attached) is located.

Figure 5:
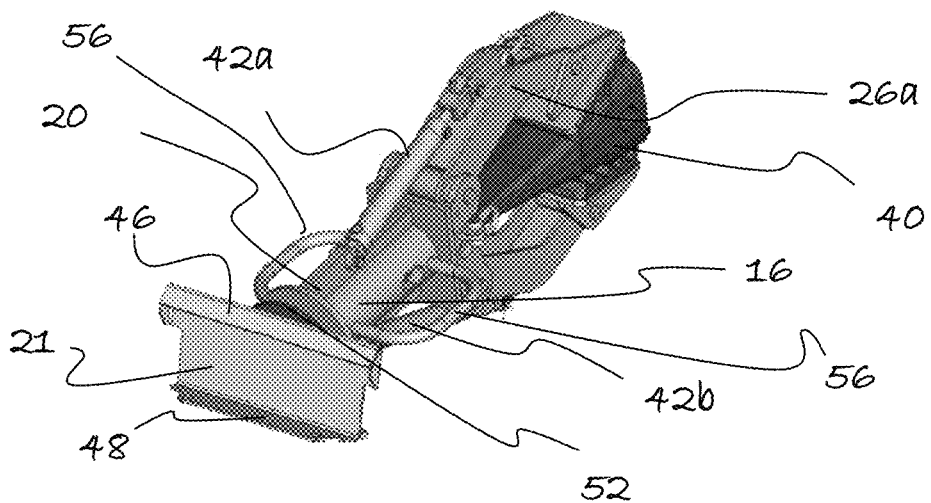
FIG. 5 is a rear perspective view of the article handler shown in FIG. 4.

Pivotal movement of the arm members 26 is accomplished via a pair of hydraulic cylinders 42 having one end attached to one of the arm members 28 and the other end attached to the support body 16 as is shown in FIG. 5. In a particular arrangement, the hydraulic cylinders 42 are operatively connected to the hydraulic fluid systems of the front end loader 12 so that the arm members 28 may be remotely actuated by an operator of the front end loader 12.

As mentioned before, the proximal end 20 of the support body 16 is adapted to be attached to a mounting plate 21 for attachment to the front end loader 12. The mounting plate 21 comprises a rear face for attachment of the support body 16 and a front face for attachment to a hitch 44 of the front loader 12. Attachment of the article handler 10 to the support plate 21 may be via bolt and nuts and/or welding as shown in FIG. 4. Reinforcement means such as ribs extending from one side of the plate 21 to the other side of the mounting plate 21, may be incorporated to the mounting plate 21.

Further, the front face of the mounting plate 21 (to be attached to the hitch 44) is adapted to secure the mounting plate 21 to the hitch 44. As shown in FIG. 5, this particular face comprises an upper flange 46 and a lower flange 48. The upper flange 46 is configured for receiving the upper end of the hitch 44 and the lower flange 48 is configured for receiving the lower end of the hitch 44. This particular arrangement of mounting plate 21 is particularly useful because it permits quick attachment and quick release of the article handler 10 to or from the hitch 44 of the front loader 12.

Moreover, as mentioned before, a particular application of the article handler 10 is adapted to selectively attach and remove teeth 40 from the adaptors of excavating buckets. There are in use, teeth 40 of twist-lock type that require to be rotated for attachment or detachment of the teeth 40 from the adaptors attached to the excavation bucket.

The particular arrangement of the article handler 10 shown in the figures is adapted to attach or remove twist-lock type teeth; for this, the article handler 10 is adapted to be rotated around its longitudinal axis. In order for the article handler 10 to rotate around its longitudinal axis, the proximal end 20 of the support body 16 is rotatably attached to the mounting plate 21 so as to permit free rotation of the article handler 10 around its longitudinal axis for twisting of a tooth 40 during attachment or detachment of the tooth 40 to or from the adaptor of the bucket. Also, the twisting can be useful for loosening up any debris and corrosion that have built up in the tooth-adaptor joint.

Figure 9:
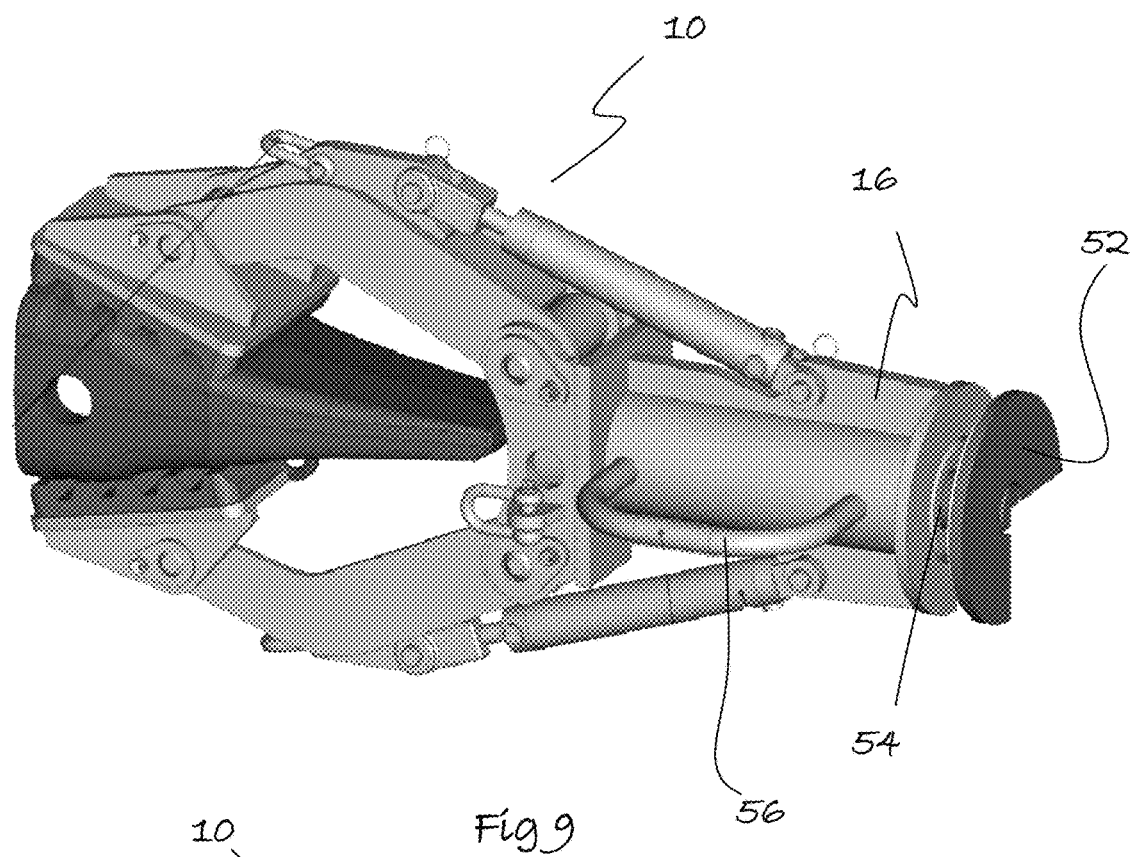
FIG. 9 is a rear perspective view of the article handler shown in FIG. 6 in the extended condition.

FIG. 9 shows a particular arrangement of an article handler 10 adapted to rotate around its longitudinal axis; in this arrangement, a disc 52 is rotatably attached to the proximal end of the support body 16. The disc 52 comprises a shaft 54 extending from the disc 52 into the support body 16. Particular sections of the shaft 54 inside the support body 16 are surrounded by bearings 60 to ease the rotation of the article handler 10.

Further, to facilitate manual rotation of the article handler 10 by an operator, the support body 16 comprises handles 56 for manually rotating the article handler 10. Alternatively, the article handler 10 may comprise means for rotating the article handler 10 from a remote location such as the cabin of the front loader 12; this alternative arrangement may comprise for example hydraulic or electric actuation means operatively attached to the article handler 10 and to the hydraulic or electric systems of the front loader 12 for rotating of the article handler 10 upon activation of the hydraulic or electric actuation means by the operator of the article handler 10.

Furthermore, as mentioned before, typically removal of the teeth 40 from the adaptor, due to having been attached to the adaptor for some time, is a difficult and cumbersome process. As mentioned before, the cause of this may be that debris and corrosion may have built up in the tooth-adaptor joint. An option for releasing the teeth 40 is to apply to the teeth 40, for example, forces along the longitudinal axis of the teeth 40. For example, for releasing the teeth 40, tensional forces (such as a pulling force) and compression forces may be selectively applied to the teeth 40 so as to loosen up any debris and corrosion that have built up in the tooth-adaptor joint.

Figure 6:
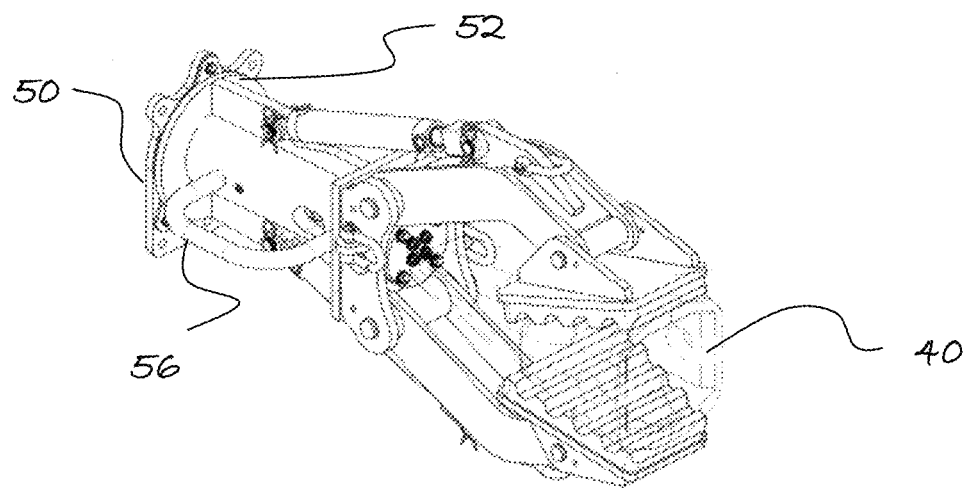
FIG. 6 is a front perspective view of the article handler shown in FIG. 4 in the contracted condition.
Figure 7:
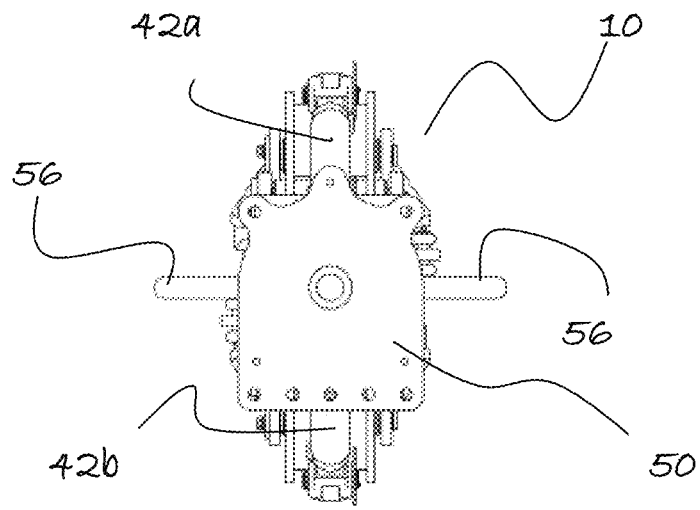
FIG. 7 is a rear view of the article handler shown in FIG. 6.
Figure 10:
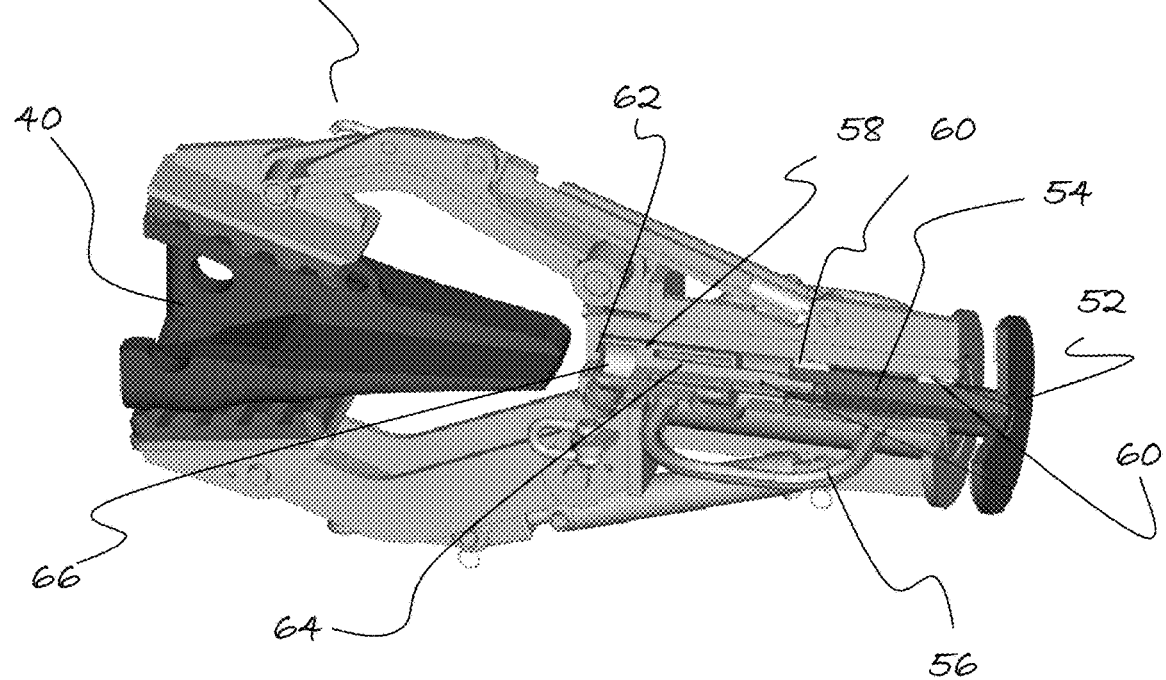
FIG. 10 is a side view of the article handler shown in FIG. 6 having a cut-out extending longitudinally along the article handler.

The particular arrangement of article handler 10 shown in FIG. 10 may apply to the teeth 40 pulling forces and compression forces due to being adapted to be selectively displaced between an extended condition (as shown in FIG. 10 the support body is distal to the hitch) and a contracted condition (as shown in FIG. 6 the support body is proximal to the hitch).

As shown in FIG. 10, the article handler 10 comprises a hydraulic retraction system 58 within the support body 16. The particular arrangement of retraction system 58 shown in FIG. 10 comprises a hydraulic cylinder 62 having a piston 64 and a hydraulic chamber 66. The hydraulic chamber 66 is fluidly connected to the hydraulic system of the font loader 12 for operation of the hydraulic cylinder 62 and the piston 64 is operatively attached to the shaft 54 extending from the disc 52 into the support body 16. This arrangement, allows for moving axially along the longitudinal axis the article handler 10.

In operation, the retraction system 58 selectively displaces the article handler 10 along the longitudinal axis of the article handler 10 through operation of the hydraulic cylinder 62 due to hydraulic fluid selectively entering and exiting the hydraulic chamber 66 of the hydraulic cylinder 62. In this manner, an operator can remotely apply tensional and compression forces to the teeth 40 by actuating the retraction system 58 inside the article handler 10. This facilitates release of the teeth 40 from the actuators in case the teeth 40 are fused to the adaptor due to debris and/or corrosion build up. Modifications and variations as would be apparent to a skilled addressee are deemed to be within the scope of the present invention. For example, the article handler 10 has been described as incorporating in one article handler 10 the options for rotating, and pulling and compressing the particular article (such as GETs); however, in alternative arrangements the article hander 12 in accordance with the present embodiment of the invention may incorporate either the option of:

(1) rotating the article; or
(2) pulling and compressing of the article.

Further, it should be appreciated that the scope of the invention is not limited to the scope of the embodiments disclosed.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. An article handler configured for attachment to a front end loader, the article handler comprising a support body and a jaw assembly comprising upper and lower arm members, the support body comprising a proximal end adapted for attachment to a hitch of a front end loader, and a distal end adapted for attachment of proximal ends of the upper and lower arm members of the jaw assembly, the jaw assembly comprising first and second gripping members spaced apart from the support body to define a clearance between the distal end of the support body and the gripping members,
wherein the clearance is adapted to receive a portion of an article to be handled by the article handler, and
wherein the first gripping member is pivotally attached to a distal end of the upper arm member and the second gripping member is pivotally attached to a distal end of the lower arm member,
the article handler further comprising a retraction system configured to selectively displace the support body between a contracted condition and an extended condition, the contracted condition being when the proximal end of the support body is proximal to the hitch of the front end loader, and the extended condition being when the proximal end of the support body is distal to the hitch.

2. The article handler of claim 1, wherein the jaw assembly is attached to the support body in such a manner that the jaw assembly may be selectively displaced between a closed condition and an open condition.

3. The article handler of claim 1, wherein the gripping members comprise an inner ribbed surface.

4. The article handler of claim 1, wherein the arm members comprise curved beams that are curved outwardly from a longitudinal axis of the article handler to at least partly define the clearance between the distal end of the support body and the gripping members.

5. The article handler of claim 1, further comprising at least one hydraulic cylinder attachable to a hydraulic system of a front end loader for selectively displacing the jaw assembly between an open condition and a closed condition.

6. The article handler of claim 1, wherein the proximal end of the support body is attached to a first face of a mounting plate and a second face of the mounting plate is configured for attachment to the hitch of the front end loader.

7. The article handler of claim 1, wherein the article handler is adapted to be rotated around a longitudinal axis of the article handler so as to rotate the jaw assembly.

8. The article handler of claim 7, wherein the support body is configured for manual rotation.

9. The article handler of claim 7, wherein the support body is configured to be rotated from a remote location.

10. The article handler of claim 9, further comprising a hydraulic or electric actuator attached to the article handler and configured to be attached to a hydraulic or electric system of the front end loader, for rotating of the article handler upon activation of the hydraulic or electric actuator by an operator of the article handler.

11. The article handler of claim 1, wherein the retraction system comprises a hydraulic cylinder having a piston and a hydraulic chamber, wherein the piston is attached to a shaft that extends into the support body, the shaft having a first end attached to the piston and a second end adapted for attachment to a hitch of the front end loader or a mounting plate.

12. The article handler of claim 11, wherein the hydraulic chamber is configured to be fluidly connected to a hydraulic system of the front end loader.

13. The article handler of claim 1, wherein the article handler is adapted to handle, install, and/or dismount a ground engaging tool (GET).

14. A system comprising the article handler of claim 1 and the front end loader, wherein the support body of the article handler is attached to the hitch of the front end loader.

15. A method of handling, installing, and/or dismounting a ground engaging tool (GET), including contacting the ground engaging tool with the article handler of claim 1, to thereby handle, install, and/or dismount the ground engaging tool.

* * * * *